United States Patent
Lin et al.

(10) Patent No.: US 11,488,786 B2
(45) Date of Patent: Nov. 1, 2022

(54) WINDING-TYPE CAPACITOR PACKAGE STRUCTURE AND METHOD OF MANUFACTURING THE SAME

(71) Applicant: APAQ TECHNOLOGY CO., LTD., Miaoli County (TW)

(72) Inventors: Chieh Lin, Hsinchu County (TW); Chung-Jui Su, Kaohsiung (TW); Ching-Feng Lin, Hsinchu County (TW); Ming-Tsung Chen, Hsinchu (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 17/024,897

(22) Filed: Sep. 18, 2020

(65) Prior Publication Data

US 2021/0296054 A1    Sep. 23, 2021

(30) Foreign Application Priority Data

Mar. 17, 2020    (TW) .................................. 109108779

(51) Int. Cl.
*H01G 9/08*    (2006.01)
*H01G 9/15*    (2006.01)

(52) U.S. Cl.
CPC .............. *H01G 9/151* (2013.01); *H01G 9/08* (2013.01)

(58) Field of Classification Search
CPC ................................... H01G 9/151; H01G 9/08
See application file for complete search history.

(56) References Cited

U.S. PATENT DOCUMENTS

| 3,221,217 A | * | 11/1965 | Hucke | ...................... | H01G 9/12 |
| | | | | | 361/539 |
| 2007/0127190 A1 | * | 6/2007 | Take | ...................... | H01G 11/78 |
| | | | | | 361/517 |
| 2020/0013557 A1 | * | 1/2020 | Matsumoto | .............. | H01G 2/10 |

FOREIGN PATENT DOCUMENTS

| CN | 202076139 U | * | 12/2011 | |
| CN | 107731516 A | * | 2/2018 | |
| JP | 6412518 A | * | 1/1989 | |
| JP | 2000252174 A | * | 9/2000 | ............... H01G 2/10 |
| JP | 2011077368 A | * | 4/2011 | |

(Continued)

*Primary Examiner* — David M Sinclair
(74) *Attorney, Agent, or Firm* — Li & Cai Intellectual Property (USA) Office

(57) ABSTRACT

A winding-type capacitor package structure and a method of manufacturing the same are provided. The winding-type capacitor package structure includes a winding assembly, a package assembly and a conductive assembly. The winding assembly includes a winding conductive positive foil and a winding conductive negative foil. The package assembly fully encloses the winding assembly. The conductive assembly includes a first conductive pin and a second conductive pin. The package assembly includes a casing structure, a filling body and a bottom enclosing structure. The casing structure has an accommodating space for receiving the winding assembly. The filling body is filled in the accommodating space for surrounding the winding assembly. The bottom enclosing structure is disposed on a bottom portion of the casing structure for carrying the winding assembly and enclosing the accommodating space. The bottom enclosing structure is surrounded by the casing structure and tightly connected to the filling body.

10 Claims, 10 Drawing Sheets

(56) References Cited

FOREIGN PATENT DOCUMENTS

| JP | 2012074643 A | * | 4/2012 | | |
| WO | WO-2008038808 A1 | * | 4/2008 | ............... | H01G 9/10 |
| WO | WO-2018181088 A1 | * | 10/2018 | ............... | H01G 2/10 |
| WO | WO-2019045072 A1 | * | 3/2019 | ............... | H01G 2/02 |

* cited by examiner

WINDING-TYPE CAPACITOR PACKAGE STRUCTURE AND METHOD OF MANUFACTURING THE SAME

CROSS-REFERENCE TO RELATED PATENT APPLICATION

This application claims the benefit of priority to Taiwan Patent Application No. 109108779, filed on Mar. 17, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a capacitor package structure and a method of manufacturing the same, and more particularly to a winding-type capacitor package structure and a method of manufacturing the same.

BACKGROUND OF THE DISCLOSURE

Various applications of capacitors include being used in home appliances, computer motherboards and peripherals, power supplies, communication products and automobiles. Capacitors such as solid electrolytic capacitors are mainly used to provide functions such as filtering, bypassing, rectifying, coupling, blocking and transforming Because the solid electrolytic capacitor has the advantages of small size, large electrical capacity and good frequency characteristic, it can be used as a decoupling element in the power circuit of a central processing unit (CPU). In general, a plurality of capacitor elements is stacked together to form a stacked solid electrolytic capacitor with a high electrical capacity. In addition, the stacked solid electrolytic capacitor of the related art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another.

SUMMARY OF THE DISCLOSURE

In response to the above-referenced technical inadequacies, the present disclosure provides a winding-type capacitor package structure and a method of manufacturing the same.

In one aspect, the present disclosure provides a winding-type capacitor package structure, including a winding assembly, a package assembly and a conductive assembly. The winding assembly includes a winding conductive positive foil, a winding conductive negative foil and two winding insulating separators. The package assembly fully encloses the winding assembly. The conductive assembly includes a first conductive pin electrically connected to the winding conductive positive foil and a second conductive pin electrically connected to the winding conductive negative foil. One of the two winding insulating separators is disposed between the winding conductive positive foil and the winding conductive negative foil, and one of the winding conductive positive foil and the winding conductive negative foil is disposed between the two winding insulating separators. The first conductive pin includes a first embedded portion enclosed inside the package assembly and a first exposed portion exposed outside the package assembly, and the second conductive pin includes a second embedded portion enclosed inside the package assembly and a second exposed portion exposed outside the package assembly. The package assembly includes a casing structure, a filling body and a bottom enclosing structure, the casing structure has an accommodating space for receiving the winding assembly, and the filling body is filled in the accommodating space for surrounding the winding assembly. The bottom enclosing structure is disposed on a bottom portion of the casing structure for carrying the winding assembly and enclosing the accommodating space, and the bottom enclosing structure is surrounded by the casing structure and is tightly connected to the filling body.

In another aspect, the present disclosure provides a winding-type capacitor package structure, including a winding assembly, a package assembly and a conductive assembly. The winding assembly includes a winding conductive positive foil and a winding conductive negative foil. The package assembly fully encloses the winding assembly. The conductive assembly includes a first conductive pin electrically connected to the winding conductive positive foil and a second conductive pin electrically connected to the winding conductive negative foil. The package assembly includes a casing structure, a filling body and a bottom enclosing structure, the casing structure has an accommodating space for receiving the winding assembly, and the filling body is filled in the accommodating space for surrounding the winding assembly. The bottom enclosing structure is disposed on a bottom portion of the casing structure for carrying the winding assembly and enclosing the accommodating space, and the bottom enclosing structure is surrounded by the casing structure and is tightly connected to the filling body.

In yet another aspect, the present disclosure provides a method of manufacturing a winding-type capacitor package structure, including: providing an initial capacitor package structure including a winding assembly, a casing structure, a filling body and a conductive assembly; placing the winding assembly, the filling body and a part of the conductive assembly inside the casing structure; placing a bottom enclosing structure inside the casing structure such that the bottom enclosing structure is adhered by the filling body; and then curing the filling body such that the bottom enclosing structure is fixed by the filling body. The winding-type capacitor package structure includes the winding assembly, the package assembly and the conductive assembly, the winding assembly includes a winding conductive positive foil and a winding conductive negative foil, and the conductive assembly includes a first conductive pin electrically connected to the winding conductive positive foil and a second conductive pin electrically connected to the winding conductive negative foil. The package assembly includes the casing structure, the filling body and the bottom enclosing structure, the casing structure has an accommodating space for receiving the winding assembly, and the filling body is filled in the accommodating space for surrounding the winding assembly. The bottom enclosing structure is disposed on a bottom portion of the casing structure for carrying the winding assembly and enclosing the accommodating space, and the bottom enclosing structure is surrounded by the casing structure and is tightly connected to the filling body.

Therefore, by virtue of "the bottom enclosing structure being surrounded by the casing structure" and "the bottom enclosing structure being tightly connected to the filling body", the bottom enclosing structure can be fixed inside the casing structure by the filling body without the need for an extra fixing structure (for example, the bottom enclosing structure can be fixed inside the casing structure without using a deformation portion of the casing structure).

Furthermore, by virtue of "placing a bottom enclosing structure inside the casing structure such that the bottom enclosing structure is adhered by the filling body" and "curing the filling body such that the bottom enclosing structure is fixed by the filling body", the bottom enclosing structure can be fixed inside the casing structure by the filling body without the need for an extra fixing method (for example, the bottom enclosing structure can be fixed inside the casing structure without changing the shape of the casing structure).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
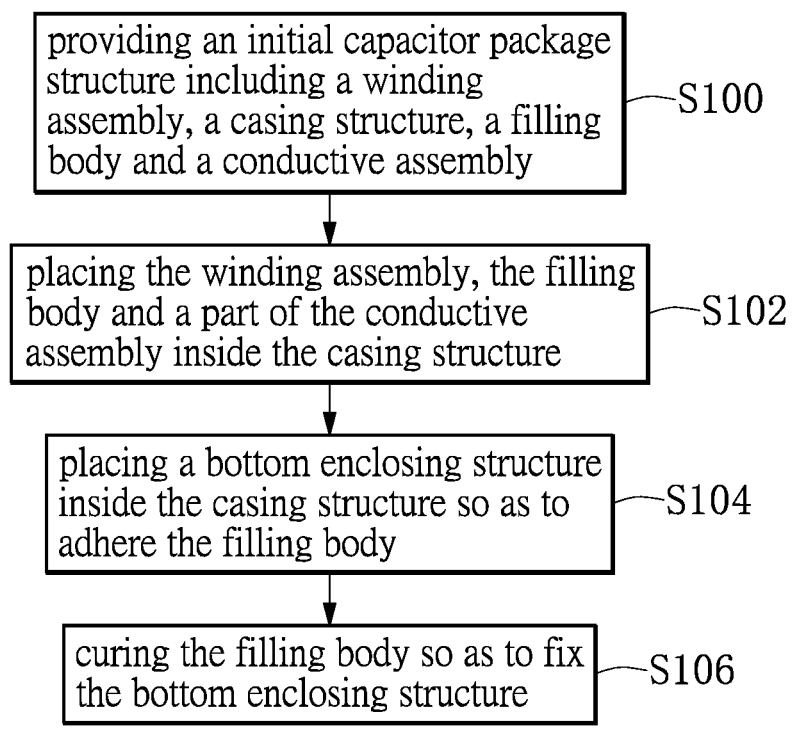
FIG. 1 is a flowchart of a method of manufacturing a winding-type capacitor package structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
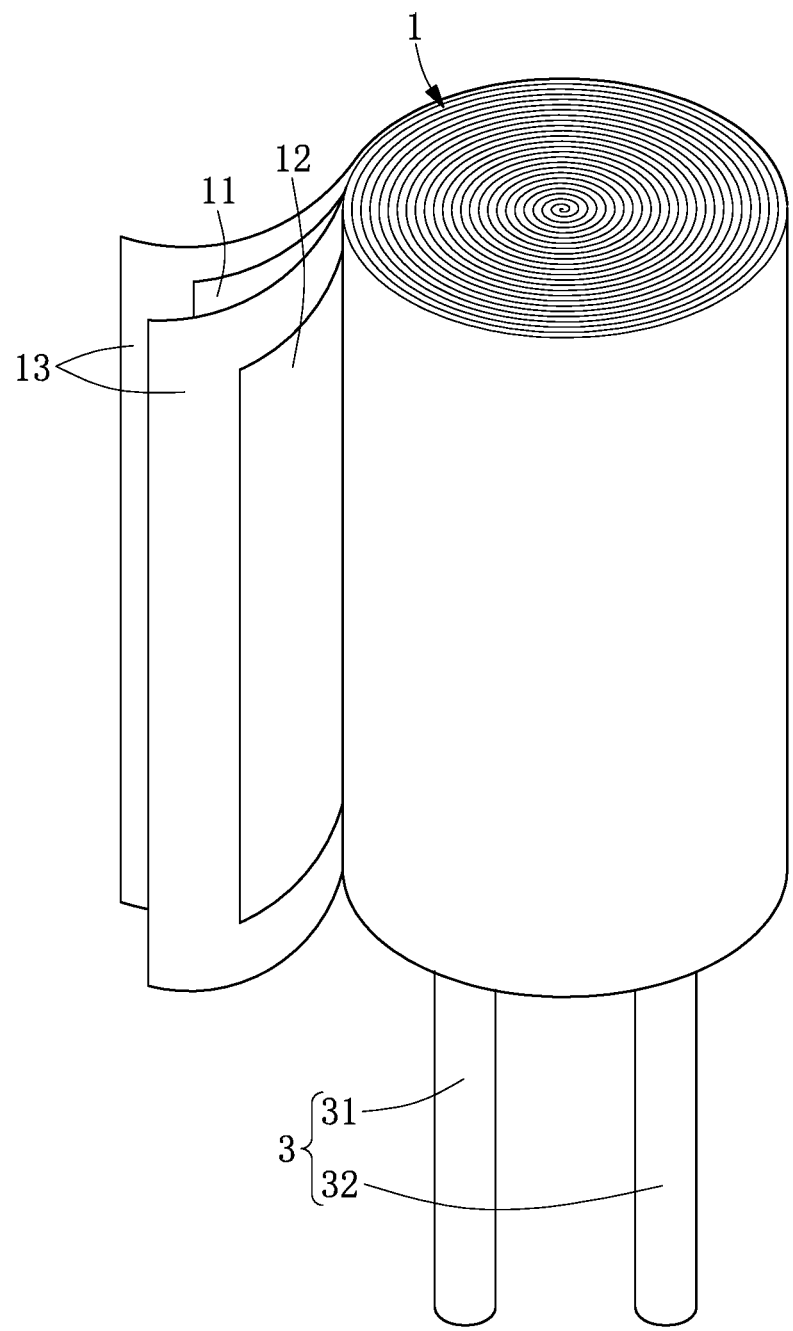
FIG. 2 is a perspective schematic view of a winding assembly of the winding-type capacitor package structure according to the first embodiment of the present disclosure.
Figure 3:
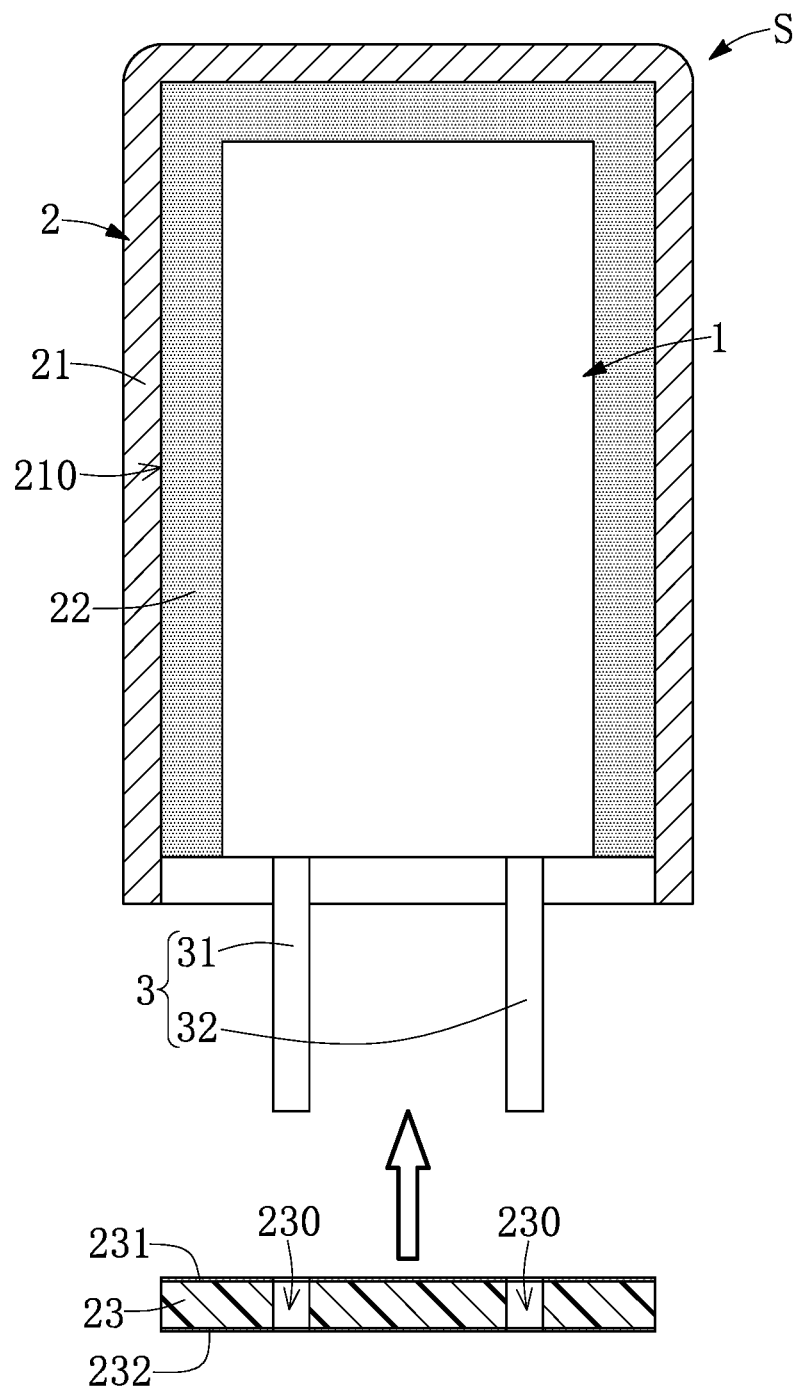
FIG. 3 is a schematic view of a bottom enclosing structure of the winding-type capacitor package structure prior to being disposed on a bottom portion of a casing structure for enclosing an accommodating space according to the first embodiment of the present disclosure.
Figure 4:
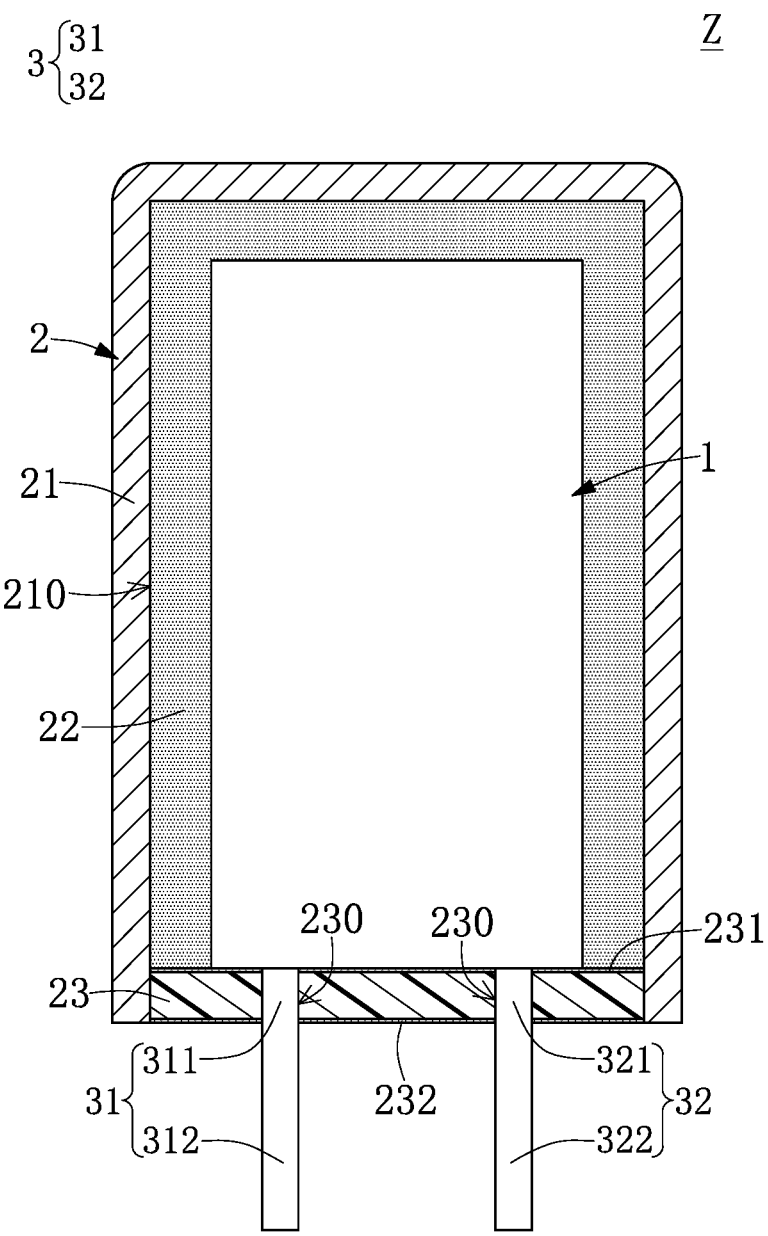
FIG. 4 is a schematic view of the winding-type capacitor package structure according to the first embodiment of the present disclosure, and specifically of the bottom enclosing structure of the winding-type capacitor package structure having been disposed on the bottom portion of the casing structure for enclosing the accommodating space according to the first embodiment of the present disclosure.

Referring to FIG. 1 to FIG. 4, FIG. 7 and FIG. 8, the present disclosure provides a method of manufacturing a winding-type capacitor package structure, including: firstly, referring to FIG. 1, FIG. 2 and FIG. 3 (or FIG. 7), providing an initial capacitor package structure S including a winding assembly 1, a casing structure 21, a filling body 22 and a conductive assembly 3 (step S100); next, referring to FIG. 1 and FIG. 3 (or FIG. 7), placing the winding assembly 1, the filling body 22 and a part of the conductive assembly 3 inside the casing structure 21 (step S102); afterwards, referring to FIG. 1 and FIG. 4 (or FIG. 8), placing a bottom enclosing structure 23 (such as a bottom sealing structure) inside the casing structure 21 so as to adhere the filling body 22 (such that the bottom enclosing structure 23 is adhered by the filling body 22) (step S104); and then referring to FIG. 1 and FIG. 4 (or FIG. 8), curing (or hardening) the filling body 22 so as to fix the bottom enclosing structure 23 (such that the bottom enclosing structure 23 can be fixed or adhered by the filling body 22) (step S106). Therefore, the bottom enclosing structure 23 can be fixed (or adhered) by the filling body 22 without an extra fixing method (for example, the bottom enclosing structure 23 can be fixed inside the casing structure 21 without changing the shape of the casing structure 21).

First Embodiment

Referring to FIG. 2 and FIG. 4, a first embodiment of the present disclosure provides a winding-type capacitor package structure Z, including a winding assembly 1, a package assembly 2 and a conductive assembly 3.

Firstly, as shown in FIG. 2, the winding assembly 1 includes a winding conductive positive foil 11, a winding conductive negative foil 12 and two winding insulating separators 13. More particularly, one of the two winding insulating separators 13 is disposed between the winding conductive positive foil 11 and the winding conductive negative foil 12, and one of the winding conductive positive foil 11 and the winding conductive negative foil 12 is disposed between the two winding insulating separators 13. For example, as shown in FIG. 2, the winding conductive positive foil 11 is disposed between the two winding insulating separators 13, and the winding insulating separator 13 may be a winding insulating paper with a conductive polymer material. However, the aforementioned description is merely an example and is not meant to limit the scope of the present disclosure.

Moreover, as shown in FIG. 4, the winding assembly 1 can be fully enclosed by the package assembly 2, and the package assembly 2 includes a casing structure 21 (such as an Al casing or other metal casing), a filling body 22 (such as a filling gel body) and a bottom enclosing structure 23. More particularly, the casing structure 21 has an accommodating space 210 (or a receiving space) for receiving the winding assembly 1, and the filling body 22 is filled in the accommodating space 210 for surrounding the winding assembly 1 (that is to say, the accommodating space 210 can be filled with the filling body 22, so that the winding assembly 1 can be surrounded by the filling body 22). In addition, the bottom enclosing structure 23 has at least two opening holes 230, and the bottom enclosing structure 23 is disposed on a bottom portion of the casing structure 21 for carrying the winding assembly 1 and enclosing the accommodating space 210. Moreover, the bottom enclosing structure 23 is surrounded by the casing structure 21 and is tightly connected to the filling body 22, so that the bottom enclosing structure 23 can be fixed inside the casing structure 21 by the filling body 22 without an extra fixing structure (for example, the bottom enclosing structure 23 can be fixed inside the casing structure 21 without using a deformation portion of the casing structure 21). For example, the filling body 22 and the bottom enclosing structure 23 can be made of any insulative material, such as epoxy or silicon, but it is merely an example and is not meant to limit the scope of the present disclosure. It should be noted that the bottom enclosing structure 23 may be a moisture barrier structure as shown in FIG. 3 or FIG. 4. For example, the bottom enclosing structure 23 includes a first moisture barrier layer 231 and a second moisture barrier layer 232 respectively disposed on two opposite surfaces thereof, and the first moisture barrier layer 231 is tightly connected to the filling body 22 so as to prevent external moisture from entering the winding-type capacitor package structure Z (or prevent the winding assembly 1 from rusting under the effect of external moisture). However, the aforementioned description is merely an example and is not meant to limit the scope of the present disclosure.

Furthermore, referring to FIG. 2 and FIG. 4, the conductive assembly 3 includes a first conductive pin 31 electrically connected to the winding conductive positive foil 11 and a second conductive pin 32 electrically connected to the winding conductive negative foil 12. For example, the first conductive pin 31 includes a first embedded portion 311 enclosed inside the package assembly 2 and a first exposed portion 312 exposed outside the package assembly 2, and the second conductive pin 32 includes a second embedded portion 321 enclosed inside the package assembly 2 and a second exposed portion 322 exposed outside the package assembly 2. More particularly, the first embedded portion 311 of the first conductive pin 31 and the second embedded portion 321 of the second conductive pin 32 are respectively disposed inside the at least two opening holes 230 of the bottom enclosing structure 23, and the first exposed portion 312 of the first conductive pin 31 and the second exposed portion 322 of the second conductive pin 32 are respectively disposed outside the at least two opening holes 230 of the bottom enclosing structure 23. However, the aforementioned description is merely an example and is not meant to limit the scope of the present disclosure.

Second Embodiment

Figure 5:
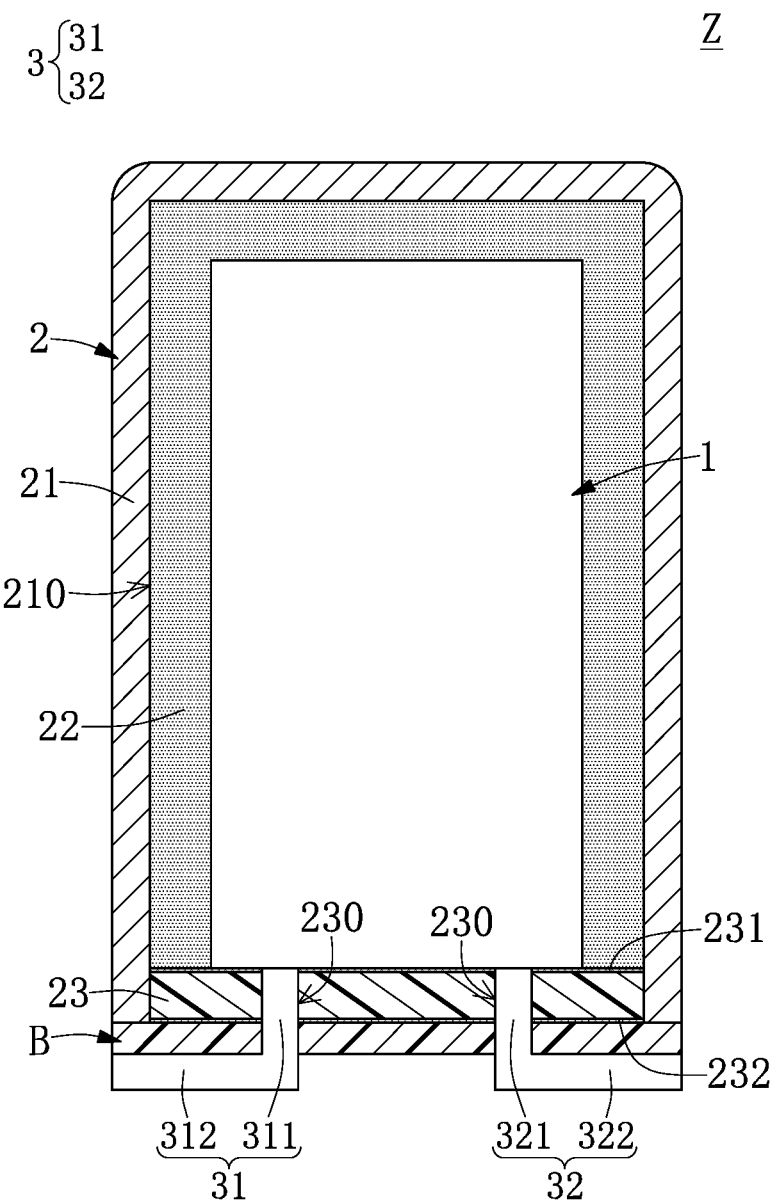
FIG. 5 is a schematic view of a winding-type capacitor package structure according to a second embodiment of the present disclosure.

Referring to FIG. 5, a second embodiment of the present disclosure provides a winding-type capacitor package structure Z, including a winding assembly 1, a package assembly 2 and a conductive assembly 3. Comparing FIG. 5 with FIG. 4, the difference between the second embodiment and the first embodiment is as follows: in the second embodiment, the winding-type capacitor package structure Z can be disposed on a bottom seat B, and the first exposed portion 312 of the first conductive pin 31 and the second exposed portion 322 of the second conductive pin 32 can be respectively bent toward two different directions and both be bent at about a 90 degree angle.

Third Embodiment

Figure 6:
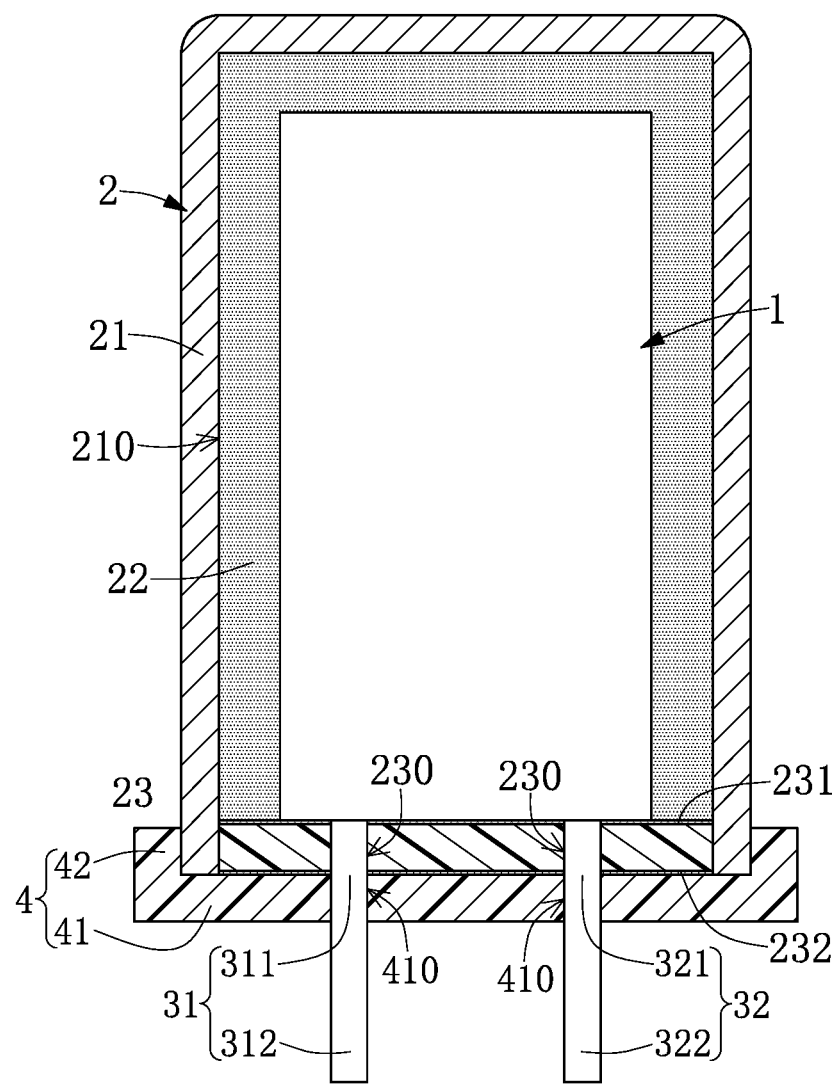
FIG. 6 is a schematic view of a winding-type capacitor package structure according to a third embodiment of the present disclosure.

Referring to FIG. 6, a third embodiment of the present disclosure provides a winding-type capacitor package structure Z, including a winding assembly 1, a package assembly 2 and a conductive assembly 3. Comparing FIG. 6 with FIG. 4, the difference between the third embodiment and the first embodiment is as follows: in the third embodiment, the winding-type capacitor package structure Z further includes a protective bottom cover 4 disposed on the bottom portion of the casing structure 21 so as to cooperate with the casing structure 21, and the protective bottom cover 4 includes a covering portion 41 for protecting the bottom enclosing structure 23 and a matching portion 42 for matching with the casing structure 21.

More particularly, as shown in FIG. 6, the covering portion 41 of the protective bottom cover 4 is disposed on the bottom portion of the casing structure 21 for contacting and covering the bottom enclosing structure 23, and the matching portion 42 of the protective bottom cover 4 is extended upwardly from a periphery of the covering portion 41 for surrounding and contacting the casing structure 21. It should be noted that the protective bottom cover 4 has at least two through holes 410, the first embedded portion 311 of the first conductive pin 31 and the second embedded portion 321 of the second conductive pin 32 are respectively disposed inside the at least two opening holes 230 of the bottom enclosing structure 23 and respectively disposed inside the at least two through holes 410 of the protective bottom cover 4, and the first exposed portion 312 of the first conductive pin 31 and the second exposed portion 322 of the second conductive pin 32 are respectively disposed outside the at least two opening holes 230 of the bottom enclosing structure 23 and respectively disposed outside the at least two through holes 410 of the protective bottom cover 4.

Fourth Embodiment

Figure 7:
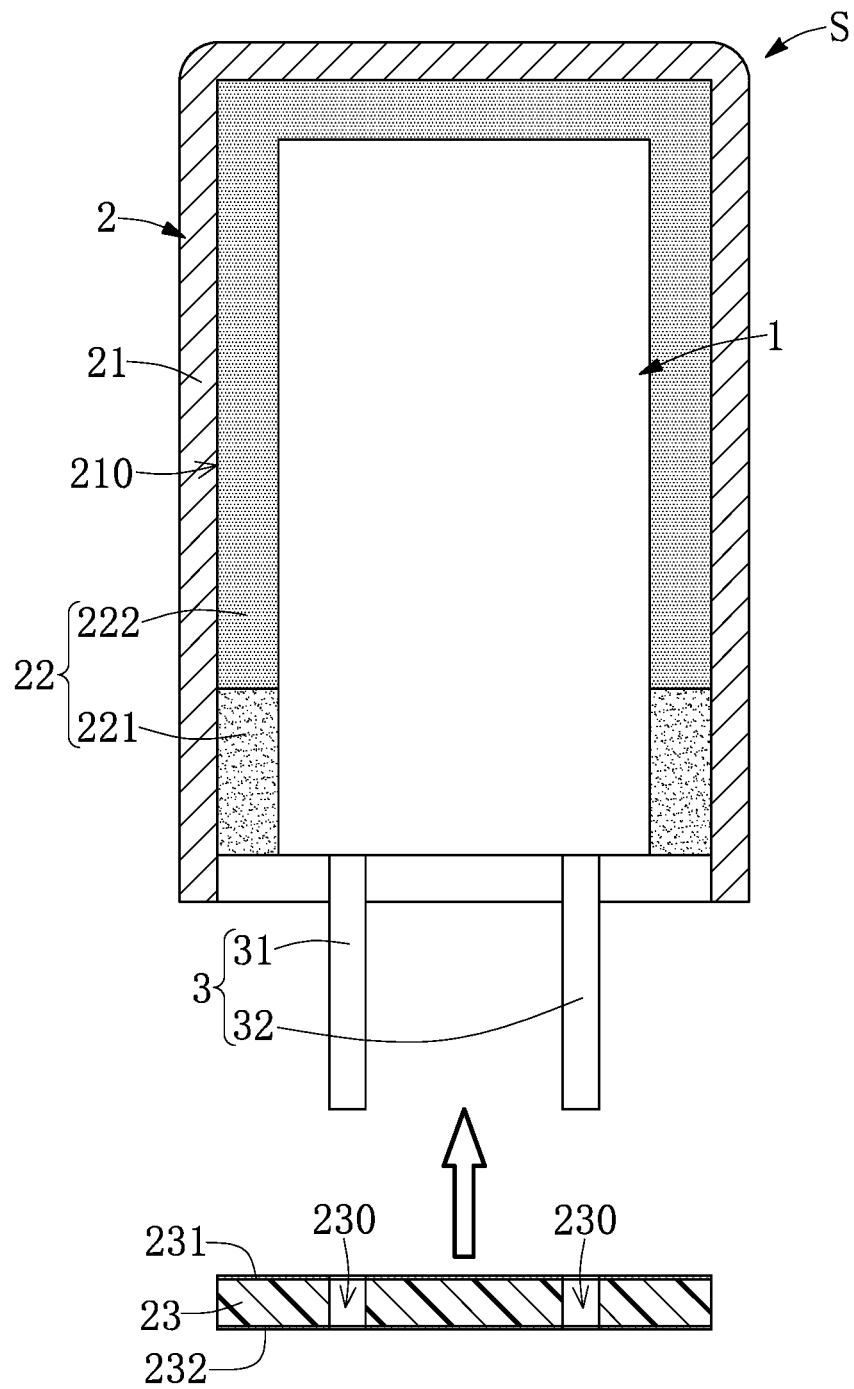
FIG. 7 is a schematic view of a bottom enclosing structure of the winding-type capacitor package structure prior to being disposed on a bottom portion of a casing structure for enclosing an accommodating space according to a fourth embodiment of the present disclosure.
Figure 8:
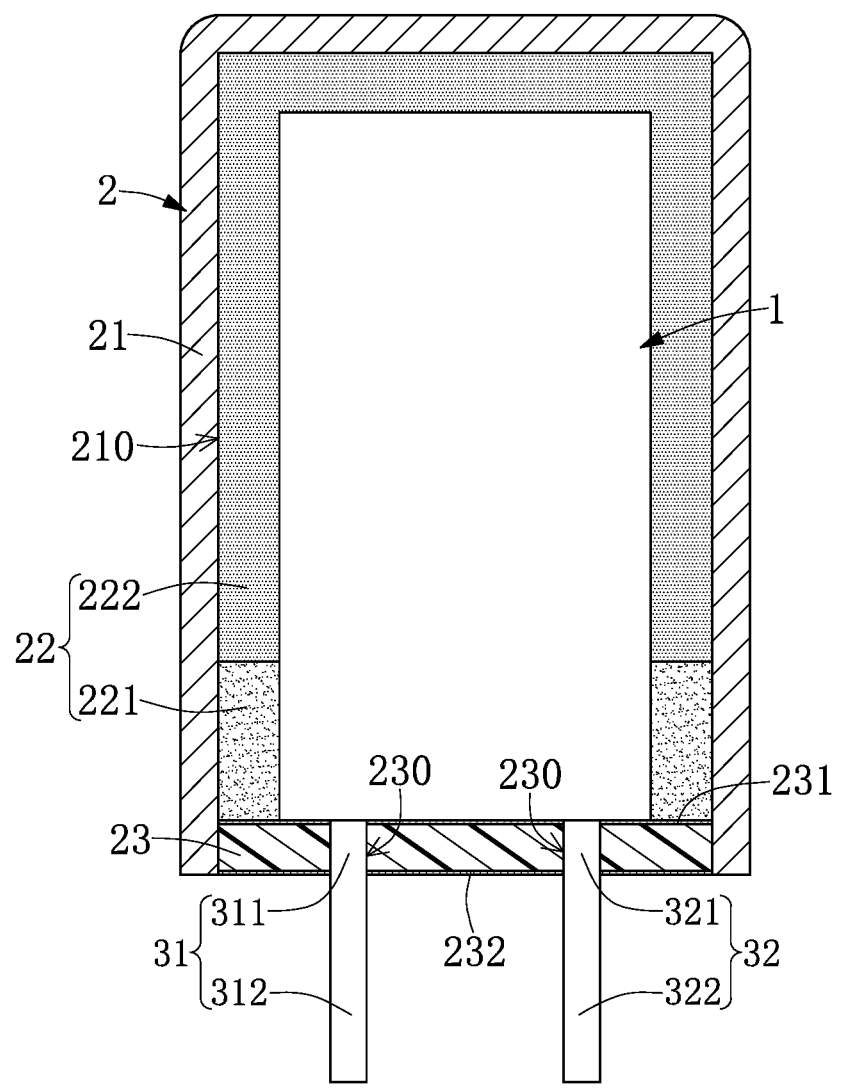
FIG. 8 is a schematic view of the winding-type capacitor package structure according to the fourth embodiment of the present disclosure, and specifically of the bottom enclosing structure of the winding-type capacitor package structure having been disposed on the bottom portion of the casing structure for enclosing the accommodating space according to the fourth embodiment of the present disclosure.

Referring to FIG. 7 and FIG. 8, a fourth embodiment of the present disclosure provides a winding-type capacitor package structure Z, including a winding assembly 1, a package assembly 2 and a conductive assembly 3. Comparing FIG. 7 with FIG. 3, and comparing FIG. 8 with FIG. 4, the difference between the fourth embodiment and the first embodiment is as follows: in the fourth embodiment, the filling body 22 includes a plurality of filling materials.

For example, the filling body 22 includes a first filling material 221 and a second filling material 222 connected to the first filling material 221. In addition, the bottom enclosing structure 23 is tightly connected to the first filling material 221, and the second filling material 222 and the bottom enclosing structure 23 are separate from each other. However, the aforementioned description is merely an example and is not meant to limit the scope of the present disclosure.

For example, a viscosity coefficient of the first filling material 221 is greater than a viscosity coefficient of the second filling material 222, so that the bottom enclosing structure 23 can be more easily adhered to the first filling material 221. However, the aforementioned description for the first filling material 221 and the second filling material 222 is merely an example and is not meant to limit the scope of the present disclosure.

For example, a heat conductivity coefficient of the first filling material 221 is greater than, equal to or smaller than a heat conductivity coefficient of the second filling material 222, so that the positions of the first filling material 221 and the second filling material 222 can be determined or adjusted according to a heat distribution of the winding assembly 1. That is to say, the filling material with high heat conductivity coefficient can be disposed on high heat-generating region of the winding assembly 1. However, the aforementioned description for the first filling material 221 and the second filling material 222 is merely an example and is not meant to limit the scope of the present disclosure.

For example, the first filling material 221 is used primarily for fixing or adhering the bottom enclosing structure 23, so that a volume of the first filling material 221 can be less than that of the second filling material 222. That is to say, the winding assembly 1 includes a first surrounding region 101 surrounded by the first filling material 221 and a second surrounding region 102 surrounded by the second filling material 222, and the first surrounding region 101 is smaller than the second surrounding region 102. However, the aforementioned description for the first surrounding region 101 and the second surrounding region 102 is merely an example and is not meant to limit the scope of the present disclosure.

It should be noted that the bottom enclosing structure 23 may be a moisture barrier structure as shown in FIG. 7 or FIG. 8. For example, the bottom enclosing structure 23 includes a first moisture barrier layer 231 and a second moisture barrier layer 232 respectively disposed on two opposite surfaces thereof, and the first moisture barrier layer 231 is tightly connected to the first filling material 221 of the filling body 22 so as to prevent external moisture from entering the winding-type capacitor package structure Z (or prevent the winding assembly 1 from rusting under the effect of external moisture). However, the aforementioned description is merely an example and is not meant to limit the scope of the present disclosure.

Fifth Embodiment

Figure 9:
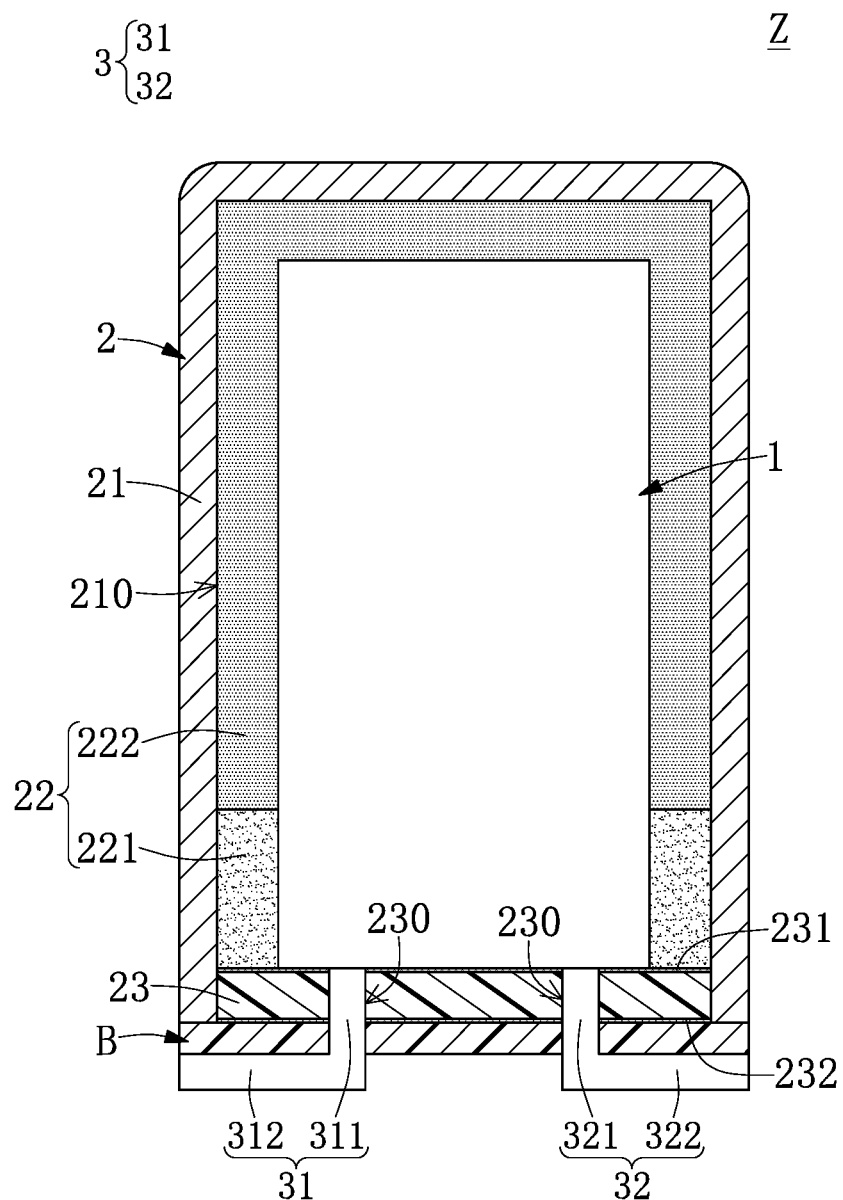
FIG. 9 is a schematic view of a winding-type capacitor package structure according to a fifth embodiment of the present disclosure.

Referring to FIG. 9, a fifth embodiment of the present disclosure provides a winding-type capacitor package structure Z, including a winding assembly 1, a package assembly 2 and a conductive assembly 3. Comparing FIG. 9 with FIG. 8, the difference between the fifth embodiment and the fourth embodiment is as follows: in the fifth embodiment, the winding-type capacitor package structure Z can be disposed on a bottom seat B, and the first exposed portion 312 of the first conductive pin 31 and the second exposed portion 322 of the second conductive pin 32 can be respectively bent toward two different directions and both be bent at about a 90 degree angle.

Sixth Embodiment

Figure 10:
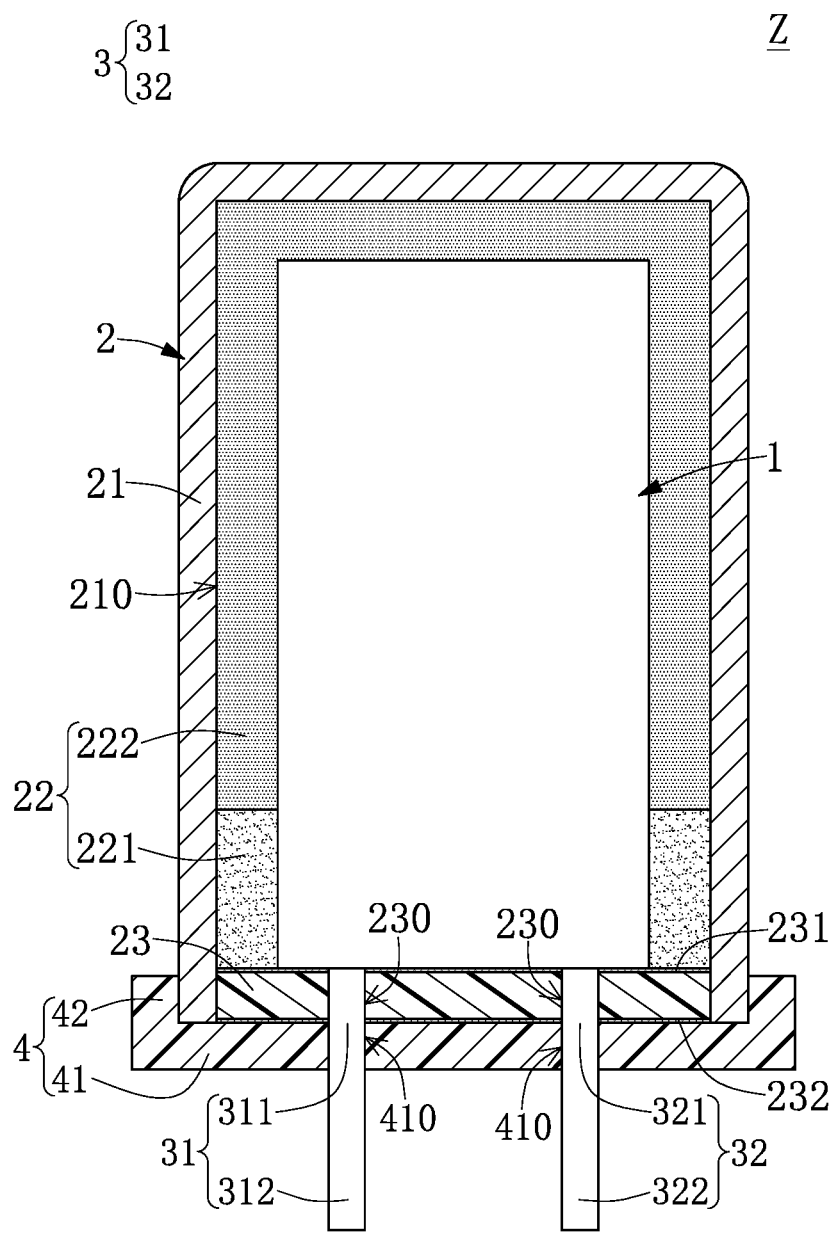
FIG. 10 is a schematic view of a winding-type capacitor package structure according to a sixth embodiment of the present disclosure.

Referring to FIG. 10, a sixth embodiment of the present disclosure provides a winding-type capacitor package structure Z, including a winding assembly 1, a package assembly 2 and a conductive assembly 3. Comparing FIG. 10 with FIG. 8, the difference between the sixth embodiment and the fourth embodiment is as follows: in the sixth embodiment, the winding-type capacitor package structure Z further includes a protective bottom cover 4 disposed on the bottom portion of the casing structure 21 so as to cooperate with the casing structure 21, and the protective bottom cover 4 includes a covering portion 41 for protecting the bottom enclosing structure 23 and a matching portion 42 for matching with the casing structure 21.

More particularly, as shown in FIG. 10, the covering portion 41 of the protective bottom cover 4 is disposed on the bottom portion of the casing structure 21 for contacting and covering the bottom enclosing structure 23, and the matching portion 42 of the protective bottom cover 4 is extended upwardly from a periphery of the covering portion 41 for surrounding and contacting the casing structure 21. It should be noted that the protective bottom cover 4 has at least two through holes 410, the first embedded portion 311 of the first conductive pin 31 and the second embedded portion 321 of the second conductive pin 32 are respectively disposed inside the at least two opening holes 230 of the bottom enclosing structure 23 and respectively disposed inside the at least two through holes 410 of the protective bottom cover 4, and the first exposed portion 312 of the first conductive pin 31 and the second exposed portion 322 of the second conductive pin 32 are respectively disposed outside the at least two opening holes 230 of the bottom enclosing structure 23 and respectively disposed outside the at least two through holes 410 of the protective bottom cover 4.

In conclusion, by virtue of "the bottom enclosing structure 23 being surrounded by the casing structure 21" and "the bottom enclosing structure 23 being tightly connected to the filling body 22", the bottom enclosing structure 23 can be fixed inside the casing structure 21 by the filling body 22 without an extra fixing structure (for example, the bottom enclosing structure 23 can be fixed inside the casing structure 21 without using a deformation portion of the casing structure 21).

Furthermore, by virtue of "placing a bottom enclosing structure 23 inside the casing structure 21 such that the bottom enclosing structure 23 is adhered by the filling body 22" and "curing the filling body 22 such that the bottom enclosing structure 23 is fixed by the filling body 22", the bottom enclosing structure 23 can be fixed inside the casing structure 21 by the filling body 22 without an extra fixing method (for example, the bottom enclosing structure 23 can be fixed inside the casing structure 21 without changing the shape of the casing structure 21).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A winding-type capacitor package structure, comprising:
    a winding assembly including a winding conductive positive foil, a winding conductive negative foil and two winding insulating separators;
    a package assembly fully enclosing the winding assembly; and
    a conductive assembly including a first conductive pin electrically connected to the winding conductive positive foil and a second conductive pin electrically connected to the winding conductive negative foil;
    wherein one of the two winding insulating separators is disposed between the winding conductive positive foil and the winding conductive negative foil, and one of the winding conductive positive foil and the winding conductive negative foil is disposed between the two winding insulating separators;
    wherein the first conductive pin includes a first embedded portion enclosed inside the package assembly and a first exposed portion exposed outside the package assembly, and the second conductive pin includes a second embedded portion enclosed inside the package assembly and a second exposed portion exposed outside the package assembly;
    wherein the package assembly includes a casing structure, a filling body and a bottom enclosing structure, the casing structure has an accommodating space for receiving the winding assembly, and the filling body is filled in the accommodating space for surrounding the winding assembly;
    wherein the bottom enclosing structure is disposed on a bottom portion of the casing structure for carrying the winding assembly and enclosing the accommodating space, and the bottom enclosing structure is surrounded by the casing structure and is tightly connected to the filling body;
    wherein the filling body includes a first filling material and a second filling material connected to and different from the first filling material, the bottom enclosing structure is tightly connected to the first filling material, and the second filling material and the bottom enclosing structure are separate from each other;
    wherein the bottom enclosing structure includes a first moisture barrier layer and a second moisture barrier layer respectively disposed on two opposite surfaces thereof, and the first moisture barrier layer is tightly connected to the first filling material;
    wherein a viscosity coefficient of the first filling material is greater than a viscosity coefficient of the second filling material;
    wherein the winding assembly includes a first surrounding region surrounded by the first filling material and a second surrounding region surrounded by the second filling material, and the first surrounding region is smaller than the second surrounding region.

2. The winding-type capacitor package structure according to claim 1, wherein a heat conductivity coefficient of the first filling material is greater than, equal to or smaller than a heat conductivity coefficient of the second filling material; wherein the bottom enclosing structure has at least two opening holes, the first embedded portion of the first conductive pin and the second embedded portion of the second conductive pin are respectively disposed inside the at least two opening holes of the bottom enclosing structure, and the first exposed portion of the first conductive pin and the second exposed portion of the second conductive pin are respectively disposed outside the at least two opening holes of the bottom enclosing structure.

3. The winding-type capacitor package structure according to claim 1, further comprising: a protective bottom cover disposed on the bottom portion of the casing structure so as to cooperate with the casing structure; wherein the protective bottom cover includes a covering portion for protecting the bottom enclosing structure and a matching portion for matching with the casing structure, the covering portion of the protective bottom cover is disposed on the bottom portion of the casing structure for contacting and covering the bottom enclosing structure, and the matching portion of the protective bottom cover is extended upwardly from a periphery of the covering portion for surrounding and contacting the casing structure; wherein the bottom enclosing structure has at least two opening holes, the protective bottom cover has at least two through holes, the first embedded portion of the first conductive pin and the second embedded portion of the second conductive pin are respectively disposed inside the at least two opening holes of the bottom enclosing structure and respectively disposed inside the at least two through holes of the protective bottom cover, and the first exposed portion of the first conductive pin and the second exposed portion of the second conductive pin are respectively disposed outside the at least two opening holes of the bottom enclosing structure and respectively disposed outside the at least two through holes of the protective bottom cover.

4. A winding-type capacitor package structure, comprising:
    a winding assembly including a winding conductive positive foil and a winding conductive negative foil;
    a package assembly fully enclosing the winding assembly; and
    a conductive assembly including a first conductive pin electrically connected to the winding conductive positive foil and a second conductive pin electrically connected to the winding conductive negative foil;
    wherein the package assembly includes a casing structure, a filling body and a bottom enclosing structure, the casing structure has an accommodating space for receiving the winding assembly, and the filling body is filled in the accommodating space for surrounding the winding assembly;

wherein the bottom enclosing structure is disposed on a bottom portion of the casing structure for carrying the winding assembly and enclosing the accommodating space, and the bottom enclosing structure is surrounded by the casing structure and is tightly connected to the filling body;

wherein the bottom enclosing structure is fixed inside the casing structure without changing a shape of the casing structure or without using a deformation portion of the casing structure;

wherein the filling body includes a first filling material and a second filling material connected to the first filling material, the bottom enclosing structure is tightly connected to the first filling material, and the second filling material and the bottom enclosing structure are separate from each other;

wherein the bottom enclosing structure includes a first moisture barrier layer and a second moisture barrier layer respectively disposed on two opposite surfaces thereof, and the first moisture barrier layer is tightly connected to the first filling material;

wherein a viscosity coefficient of the first filling material is greater than a viscosity coefficient of the second filling material;

wherein the winding assembly includes a first surrounding region surrounded by the first filling material and a second surrounding region surrounded by the second filling material, and the first surrounding region is smaller than the second surrounding region.

5. The winding-type capacitor package structure according to claim 4, wherein a heat conductivity coefficient of the first filling material is greater than, equal to or smaller than a heat conductivity coefficient of the second filling material; wherein the bottom enclosing structure has at least two opening holes, a first embedded portion of the first conductive pin and a second embedded portion of the second conductive pin are respectively disposed inside the at least two opening holes of the bottom enclosing structure, and a first exposed portion of the first conductive pin and a second exposed portion of the second conductive pin are respectively disposed outside the at least two opening holes of the bottom enclosing structure.

6. The winding-type capacitor package structure according to claim 4, further comprising: a protective bottom cover disposed on the bottom portion of the casing structure so as to cooperate with the casing structure; wherein the protective bottom cover includes a covering portion for protecting the bottom enclosing structure and a matching portion for matching with the casing structure, the covering portion of the protective bottom cover is disposed on the bottom portion of the casing structure for contacting and covering the bottom enclosing structure, and the matching portion of the protective bottom cover is extended upwardly from a periphery of the covering portion for surrounding and contacting the casing structure; wherein the bottom enclosing structure has at least two opening holes, the protective bottom cover has at least two through holes, a first embedded portion of the first conductive pin and a second embedded portion of the second conductive pin are respectively disposed inside the at least two opening holes of the bottom enclosing structure and respectively disposed inside the at least two through holes of the protective bottom cover, and a first exposed portion of the first conductive pin and a second exposed portion of the second conductive pin are respectively disposed outside the at least two opening holes of the bottom enclosing structure and respectively disposed outside the at least two through holes of the protective bottom cover.

7. A method of manufacturing a winding-type capacitor package structure, comprising:
providing an initial capacitor package structure including a winding assembly, a casing structure, a filling body and a conductive assembly;
placing the winding assembly, the filling body and a part of the conductive assembly inside the casing structure;
placing a bottom enclosing structure inside the casing structure such that the bottom enclosing structure is adhered by the filling body; and
curing the filling body such that the bottom enclosing structure is fixed by the filling body;
wherein the winding-type capacitor package structure comprises the winding assembly, the package assembly and the conductive assembly, the winding assembly includes a winding conductive positive foil and a winding conductive negative foil, and the conductive assembly includes a first conductive pin electrically connected to the winding conductive positive foil and a second conductive pin electrically connected to the winding conductive negative foil;
wherein the package assembly includes the casing structure, the filling body and the bottom enclosing structure, the casing structure has an accommodating space for receiving the winding assembly, and the filling body is filled in the accommodating space for surrounding the winding assembly;
wherein the bottom enclosing structure is disposed on a bottom portion of the casing structure for carrying the winding assembly and enclosing the accommodating space, and the bottom enclosing structure is surrounded by the casing structure and is tightly connected to the filling body;
wherein the filling body includes a first filling material and a second filling material connected to and different from the first filling material, the bottom enclosing structure is tightly connected to the first filling material, and the second filling material and the bottom enclosing structure are separate from each other;
wherein the bottom enclosing structure includes a first moisture barrier layer and a second moisture barrier layer respectively disposed on two opposite surfaces thereof, and the first moisture barrier layer is tightly connected to the first filling material;
wherein a viscosity coefficient of the first filling material is greater than a viscosity coefficient of the second filling material;
wherein the winding assembly includes a first surrounding region surrounded by the first filling material and a second surrounding region surrounded by the second filling material, and the first surrounding region is smaller than the second surrounding region.

8. The method according to claim 7, wherein the bottom enclosing structure is fixed inside the casing structure without changing a shape of the casing structure or without using a deformation portion of the casing structure; wherein a heat conductivity coefficient of the first filling material is greater than, equal to or smaller than a heat conductivity coefficient of the second filling material; wherein the bottom enclosing structure has at least two opening holes, a first embedded portion of the first conductive pin and a second embedded portion of the second conductive pin are respectively disposed inside the at least two opening holes of the bottom enclosing structure, and a first exposed portion of the first conductive pin and a second exposed portion of the second conductive pin are respectively disposed outside the at least two opening holes of the bottom enclosing structure.

9. The method according to claim 7, further comprising: a protective bottom cover disposed on the bottom portion of the casing structure so as to cooperate with the casing structure.

10. The method according to claim 9, wherein the protective bottom cover includes a covering portion for protecting the bottom enclosing structure and a matching portion for matching with the casing structure, the covering portion of the protective bottom cover is disposed on the bottom portion of the casing structure for contacting and covering the bottom enclosing structure, and the matching portion of the protective bottom cover is extended upwardly from a periphery of the covering portion for surrounding and contacting the casing structure; wherein the bottom enclosing structure has at least two opening holes, the protective bottom cover has at least two through holes, a first embedded portion of the first conductive pin and a second embedded portion of the second conductive pin are respectively disposed inside the at least two opening holes of the bottom enclosing structure and respectively disposed inside the at least two through holes of the protective bottom cover, and a first exposed portion of the first conductive pin and a second exposed portion of the second conductive pin are respectively disposed outside the at least two opening holes of the bottom enclosing structure and respectively disposed outside the at least two through holes of the protective bottom cover.

* * * * *